July 14, 1964     D. B. DOOLITTLE     3,140,761
ROTARY FLUID BRAKE MEANS
Filed Aug. 21, 1962     4 Sheets-Sheet 1

FIG. I.

INVENTOR
Donald Beach Doolittle
BY
ATTORNEY

July 14, 1964 D. B. DOOLITTLE 3,140,761
ROTARY FLUID BRAKE MEANS

Filed Aug. 21, 1962 4 Sheets-Sheet 4

INVENTOR
Donald Beach Doolittle

BY *Herbert M Birch*

ATTORNEY

United States Patent Office 3,140,761
Patented July 14, 1964

3,140,761
ROTARY FLUID BRAKE MEANS
Donald Beach Doolittle, Wilmington, Del., assignor to All American Engineering Company, Wilmington, Del., a corporation of Delaware
Filed Aug. 21, 1962, Ser. No. 218,254
4 Claims. (Cl. 188—90)

The present invention relates generally to energy absorber units for aircraft arrestment having a rotary fluid brake means mounted on a rotor shaft for rotation between vertically spaced stator blades below a cable or tape drum and particularly to control means for changing the fluid flow path developed in the brake means housing by varying the depth of the stator spaces between the blades as the brake motor is revolved by the payout of the cable or tape from the drum.

The particular control means of this invention generally includes movable control of means for changing the rotor generated flow pattern of the fluid in the brake housing, such means when moved to variable positions serving to effect the "K" factor of the energy absorber unit. For example, the torque output of the fluid brake varies as the square of the r.p.m. ($n$) or Torque=$K(n)^2$, where K is the over-all drag coefficient of the brake. K can also be accurately predicted for new brake sizes since K is directly proportional to the fifth power of the diameter ratio. For example, the tape tension developed by the unit at a given point during tape runout is equal to the torque developed divided by the radius to the outside wrap of tape, such as suitable nylon tape on the drum.

Throughout the several embodiments hereinafter described relating to control of the flow path to effect the K factor of the unit, each unit A and B hereinafter described in detail comprises a drum, a tape wrapped around the drum, such as a nylon tape, a rotary fluid brake including a fluid filled housing and a rotor therein having a shaft with a hub portion extending from the housing to which the tape drum is keyed for rotation of the drum and the rotor, whereby torque from the rotor in the fluid filled housing is applied to the tape as it is unwound from the drum by a pulling force, such as described in connection with prior co-pending application Serial No. 177,493 filed in the name of Donald B. Doolittle for an "Arresting Gear and Retrieve System," and assigned to the assignee of this invention.

An object of this invention is to vary the turbulent fluid flow path produced by the rotor in the brake housing of a rotary fluid brake.

Another object is to provide positively actuated means for diverting the rotor generated flow path of fluid in a rotary fluid brake by means for varying the depth of pockets or spaces between the stator blades of the brake with respect to the brake rotor.

A further object is to provide novel vertically movable means in a rotary fluid brake housing and means for moving said movable means vertically to divert the flow path of fluid set up by the rotation of the rotor in the brake housing, whereby the over-all drag coefficient of the brake is controllable.

Still another object is to provide movable vane members in the housing of a fluid brake with a rotor therein, and mechanical and/or hydraulic operating means for moving said vane members to various raised and lowered positions in the rotor generated flow path of the fluid in the housing, to thereby vary the depth of the stator pockets between stator vanes.

The above and other objects and advantages of the present invention will appear more fully hereinafter from a consideration of the detailed description which follows, taken with the accompanying drawings wherein two embodiments thereof are illustrated. It is to be expressly understood, however, that the drawings are for the purpose of illustration only and are not intended as a definition of the limits of the invention.

In the drawings, wherein like reference characters refer to like parts throughout the several views:

FIGURE 1 is a cross section view of a first embodiment of the invention showing a rotary brake of an energy absorber unit including a tape drum shown in side elevation and a retrieve drive chain and sprocket for rewinding the tape drum after tape payout action with stator blades having vertically displaceable plates mounted between the stator blades and inflatable controlling means operatively associated with each plate for vertically displacing each plate between adjacent stator blades;

Figure 1:
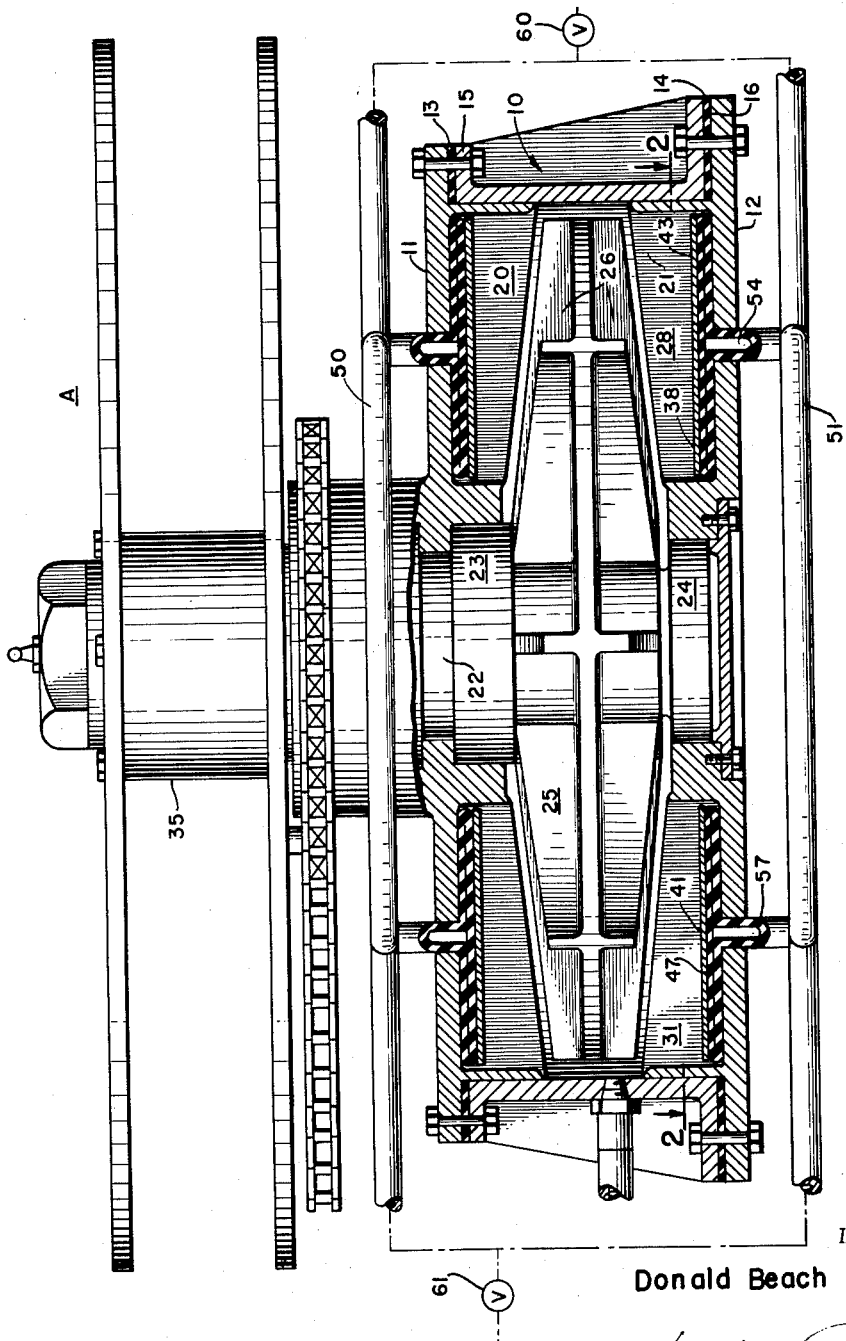
Figure 2:
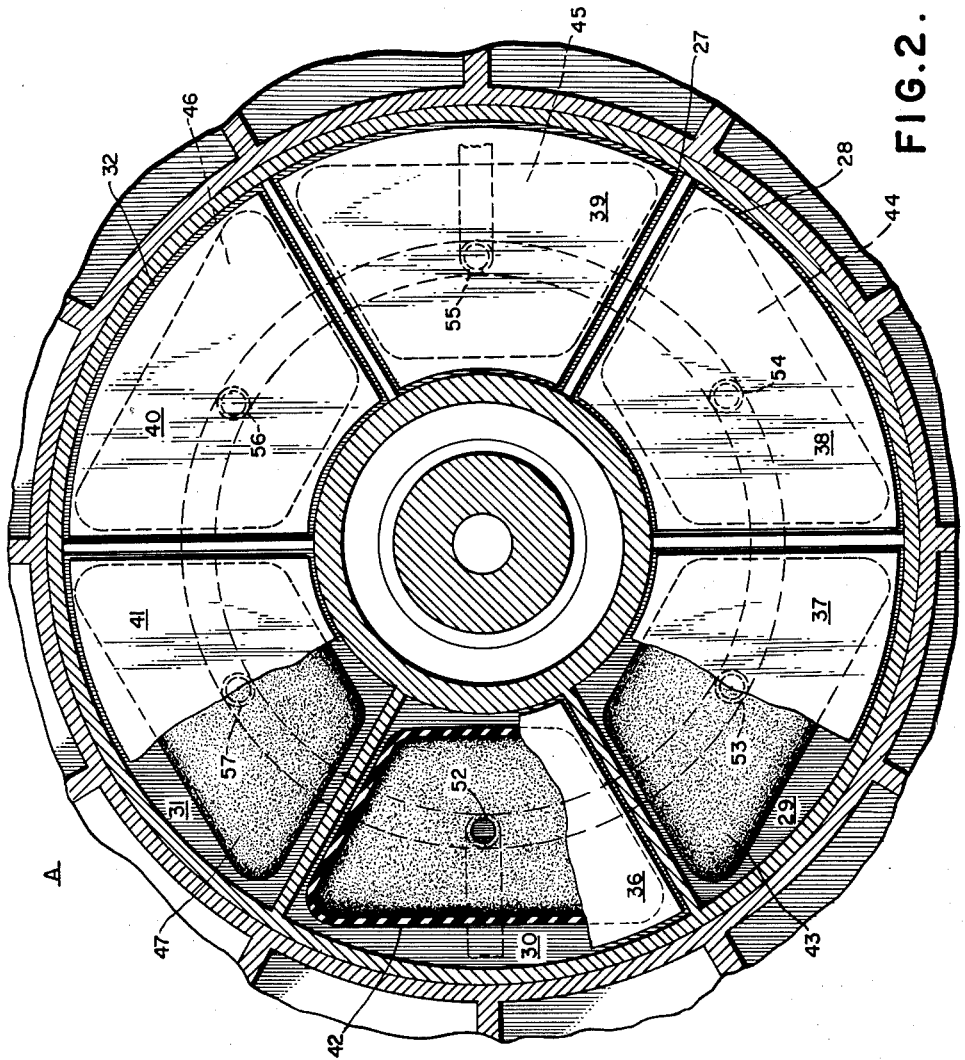
FIGURE 2 is a partial cross section view, taken on line 2—2 of the brake housing of FIGURE 1 with a top plan view showing the inflatable controlling means and the said associated plates between each of the stator blades.

Referring in detail to the drawing and first with particular reference to the first embodiment depicted in FIGURES 1 and 2, there is shown an energy absorber unit A comprising a sealed cylindrical liquid housing 10 closed by top and bottom annular plates 11 and 12. Each respective plate is sealed by ring gaskets 13 and 14, respectively to the top and bottom rims 15 and 16 of the cylindrical wall of the housing 10.

Lower stator vanes 21 are formed on a radial axis from bottom plate 12 and upper stator vanes 20 are formed on a radial axis from the inner opposed face of top plate 11 of the housing 10.

Mounted on a rotor shaft 22 centrally journalled in vertically spaced bearings 23 and 24 is a rotor 25 having its blades 26 extending radially between the opposed vertically spaced apart stator vanes 20 and 21 of the respective upper and lower annular plates.

As each upper and lower groups of stator vanes or blades extend radially from their respective upper and lower center bearing positions at the rotor shaft 22, they provide sector-shaped spaces or pockets such as indicated by numerals 27, 28, 29, 30, 31 and 32, see FIGURE 2, in which fluid is confined or circulated as the rotor 25 is idle or is rotated. During rotor rotation, which results from rotation of the tape drum 35 keyed to rotor shaft by payout of tape, not shown, from the drum during an operating cycle of the unit. This revolution of the rotor 25 causes the fluid in the housing 10 to follow a turbulent flow path pattern and it is the purpose of this invention to provide control means, such as a plurality of sector plates 36 through 41 between each adjacent pair of stator blades or vanes to controllably vary the flow path pattern, to thereby effect the K factor of the unit.

Each sector plate 36 through 41, as shown in FIGURES 1 and 2, are bodily raised or lowered upon the inflation of a plurality expansible bladder means 42 through 47 positioned in each stator vane pocket 27 through 32, respectively of each of the respective annular top and bottom stator plates 11 and 12. One of each of these bladders are suitably secured to each of the respective sector control plates, as by vulcanizing, epoxy resin adhesive or the like and when each bladder is inflated or deflated it vertically carries the respectively associated sector plates with the connected movable wall portion thereof, to thereby vary the size or volume of the space between each of the stator blades to effect the K factor of the fluid flow path.

Air, gas or liquid pressure may be used to inflate each bladder, which is supplied through upper and lower annular manifolds 50 and 51. Each of these manifolds are provided with a branch tubular coupling 52 through 57, which feeds air or gas into each respective bladder. Such air or gas supply may be fed through an inlet valve 60 at one side of the unit housing 10 and rapidly exhausted by a second valve or an exhaust pump generally indicated by numeral 61 at the opposite side of the unit housing.

In operation of this embodiment, assuming the tape drum 35 is being rotated to payout tape therefrom, the rotor 25, between the upper and lower stator vanes 20 and 21, revolves and causes the fluid in the housing 10 to follow a turbulent flow path pattern. This flow path pattern, if desired, may be changed, to thereby effect the K factor of the unit by inflating the bladders below secured to each pie-shaped sector control plate, to the positions as shown in FIGURE 2. Thus variable control of the potential braking force of the rotary brake may be obtained by varying the depth of the spaces or pockets between the stator blades to thus divert the fluid flow path in the brake housing for effect of K, K as above stated being the over-all drag coefficient of the brake.

Figure 3:
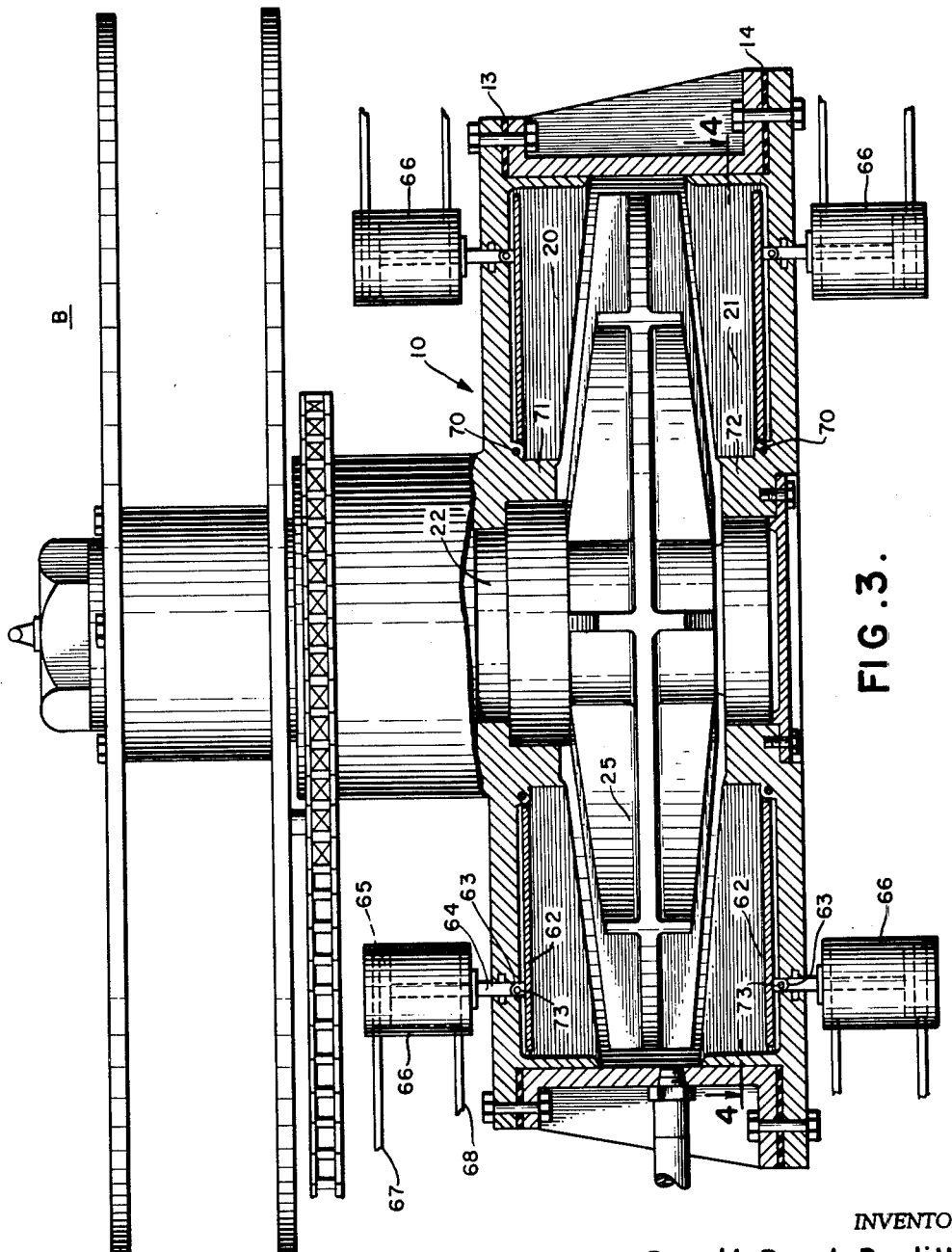
FIGURE 3 is a second embodiment of the invention showing the elements of FIGURE 1 except that the control plates between the stator vanes are pivoted at one side to the stator housing and are fluid actuated as shown and thus positioned in between the vanes in the housing for fluid flow interference when raised.
Figure 4:
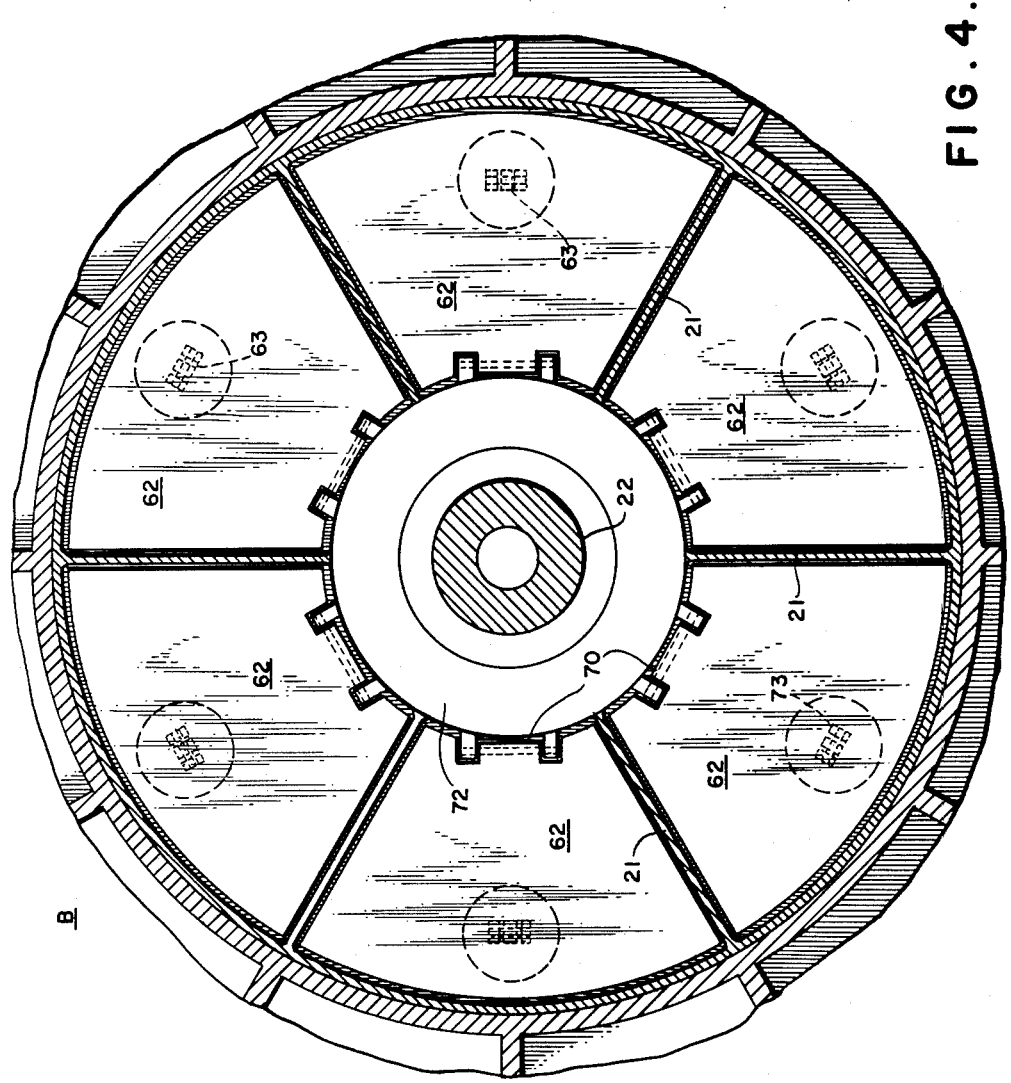
FIGURE 4 is a cross section view taken along line 3—3 of FIGURE 3 showing a top plan view of the control plates.

A seond embodiment of this invention generally indicated as B, is disclosed in FIGURES 3 and 4 of the drawings and includes the brake fluid filled housing 10 and rotor 25, but with pivoted pie-shaped sector plates 62 between the stator vanes. In this embodiment, the fluid path diverting means are pivotally mounted in each respective stator pocket or space between stator blades in the upper and lower portions of the housing, so as to be extensible in an arc between respectively adjacent upper and lower stator vanes or blades 20 and 21.

Each respective pie-shaped control or diverter plate is pivoted by hinges 70 to upper and lower center bosses 71 and 72 of the stator housing and said plates are each formed on one face with an apertured lug 63, which may be suitably connected to a piston rod 64 from a piston 65 in a fluid cylinder 66 by pivot pins 73. This cylinder is connected to a suitable source of fluid which may be supplied through conduits 67 and 68 leading respectively to opposite sides of the piston 65, to thereby either pivot or retract the sector plates 62, as shown in FIGURE 4, to thereby interfere with the flow path of fluid generated by rotation of the rotor 25 in the housing 10 or retracted to inactive position, as shown in FIGURE 3.

Thus the flow path of the fluid in housing 10, which may be water, a mixture of water and anti-freeze, or suitable fluid is changeable by the respective upper and lower pie-shaped sector plates 62 mounted for vertical movment at the top and bottom of the housing toward and away from each other into the pockets between each next adjacent upper and lower set of stator vanes.

Thus there are provided novel control means arrangements to effect the K factor of a rotary brake unit of the type described, which control means are simple, economical and efficient in performance for the purpose intended.

Without further description it is believed that the advantages of the present invention over the prior art is apparent and while only two embodiments of the same are illustrated, it is to be expressly understood that the same is not limited thereto as various changes may be made in the combination and arrangement of the parts illustrated, as will now likely appear to others and those skilled in the art.

For a definition of the scope or limits of the invention, reference should be had to the appended claims.

What is claimed is:

1. In a fluid brake unit including a housing with vertically spaced upper and lower stator vanes and a rotor therein between said vanes, a vertical rotor shaft on which said rotor is mounted, centrally positioned vertically spaced rotor bearings, said vertical rotor shaft being journalled to rotate at each end in said bearings, control means in the space between said vanes to effect the K factor of the unit, said control means comprising fluid flow path changing means, said control means each including a horizontal plate, each said plate being secured solely to inflatable means, said inflatable means being expansible in the housing between the stator vanes to vary depth of the space between said vanes, and means for selectively inflating and deflating said inflatable means.

2. In a fluid brake unit including a housing with vertically spaced upper and lower stator vanes and a rotor therein between said vanes, a vertical rotor shaft on which said rotor is mounted, centrally positioned vertically spaced rotor bearings, said vertical rotor shaft being journalled to rotate at each end in said bearings, control means in the space between said vanes to effect the K factor of the unit, said control means comprising fluid flow path changing means, said control means each including a horizontal plate, each said plate being secured solely to inflatable means, said inflatable means being expansible in housing between the stator vanes, a manifold air supply having connections with each respective inflatable means, an inlet valve for said manifold for selectively inflating said means, and an air exhaust means for selectively exhausting air from said inflatable means and said manifold air supply.

3. In a fluid brake unit including a housing having top and bottom walls with vertically spaced upper and lower stator vanes carried by the respective inner faces thereof, said vanes being spaced from each other radially to provide a space with a bottom sector-shaped surface between each adjacent vane and a rotor therein between said upper and lower stator vanes, a vertical rotor shaft in which said rotor is mounted, centrally positioned vertically spaced upper and lower rotor bearings, one mounted in each said respective top and bottom walls said vertical rotor shaft being journalled at each end in said bearings, control means in the spaces between adjacent stator vanes of the respective upper and lower stator vanes on the inner faces of said respective top and bottom housing walls, said control means each comprising a pie-shaped sector plate with the broad faces thereof adjacent with respect to sector-shaped surfaces of the said respective top and bottom housing walls and mounted to move between adjacent stator vanes of each of said upper and lower stator vanes, and fluid actuated operating means operatively connected to each said sector plate for vertically displacing the respective broad faces of each said sector plate with respect to the broad adjacent faces of each said adjacent top and bottom wall sector-shaped surfaces, to thereby vary the positions of each said respective sector plates in the space between the respective faces of each said adjacent vanes to effect the K factor of the unit.

4. The invention as defined in claim 3, wherein each said sector plate of said respective top and bottom walls is pivoted to said top and bottom walls of the housing between adjacent stator vanes annularly adjacent to each of the respective upper and lower rotor bearings.

References Cited in the file of this patent

UNITED STATES PATENTS

| | | |
|---|---|---|
| 342,255 | Gornall | May 18, 1886 |
| 1,617,276 | Sarff | Feb. 8, 1927 |
| 2,105,712 | Welch et al. | Jan. 18, 1938 |
| 2,396,071 | Anderson et al. | Mar. 5, 1946 |
| 2,452,550 | Cline | Nov. 2, 1948 |
| 2,619,212 | Cardwell et al. | Nov. 25, 1952 |

FOREIGN PATENTS

| | | |
|---|---|---|
| 576,462 | France | May 14, 1924 |